US012600110B2

(12) United States Patent
     Li

(10) Patent No.: US 12,600,110 B2
(45) Date of Patent: Apr. 14, 2026

(54) DUAL-PURPOSE LAYERED OPTICAL STRUCTURE

(71) Applicant: Wicue, Inc., Cupertino, CA (US)

(72) Inventor: Fenghua Li, Cupertino, CA (US)

(73) Assignee: Wicue, Inc.

( * ) Notice: Subject to any disclaimer, the term of this patent is extended or adjusted under 35 U.S.C. 154(b) by 1094 days.

(21) Appl. No.: 17/651,568

(22) Filed: Feb. 17, 2022

(65) Prior Publication Data

US 2022/0274375 A1 Sep. 1, 2022

Related U.S. Application Data

(60) Provisional application No. 63/154,594, filed on Feb. 26, 2021.

(51) Int. Cl.
     *G02B 5/30* (2006.01)
     *B32B 7/023* (2019.01)
     *G02B 5/08* (2006.01)

(52) U.S. Cl.
     CPC ........... *B32B 7/023* (2019.01); *G02B 5/0808* (2013.01); *G02B 5/3033* (2013.01); *B32B 2367/00* (2013.01); *B32B 2383/00* (2013.01); *B32B 2457/208* (2013.01)

(58) Field of Classification Search
     CPC ................ G02B 5/0808; G02B 5/3033; G02B 27/0172; G02B 5/30; G02F 1/1335; G02F 1/133555; G02F 1/13363; G02F 1/133536; G02F 1/13362; G02F 1/133528
     See application file for complete search history.

(56) References Cited

U.S. PATENT DOCUMENTS

| | | | | |
|---|---|---|---|---|
| 5,986,730 A | * | 11/1999 | Hansen | ............... G02F 1/13362 349/96 |
| 6,160,595 A | * | 12/2000 | Kishimoto | ........ G02F 1/133536 349/115 |
| 2005/0057701 A1 | | 3/2005 | Weiss | |
| 2012/0257123 A1 | | 10/2012 | Lee | |
| 2020/0225551 A1 | * | 7/2020 | Chang | ................... G02F 1/1677 |
| 2022/0297603 A1 | | 9/2022 | Li | |
| 2022/0305998 A1 | | 9/2022 | Li | |

FOREIGN PATENT DOCUMENTS

JP 2011112927 A * 6/2011

OTHER PUBLICATIONS

U.S. Non-Final Office Action dated Jul. 27, 2022, in U.S. Appl. No. 17/656,157.

* cited by examiner

*Primary Examiner* — Ephrem Z Mebrahtu

(57) ABSTRACT

An optical structure with high transmittance of an underlying display and reflective properties is disclosed. The optical structure has a semi-transmittance and semi-reflective layer and may have an optical compensation layer which may allow a higher transmittance of light through the semi-transmittance and semi-reflective layer. Light from the display is highly transmittable through the optical structure to a user. When the display is off, reflected light from a user allows the user to use the optical structure as a mirror. The optical structure may be adhered to a display by a rear adhesive.

14 Claims, 5 Drawing Sheets

500

Display (502)
1st protective layer (506)
Optical compensation layer (508)
Transflective layer (510)
2nd protective layer (512)

Display emitted light (520)

User (522)

Reflected light (524)

Dual-purpose layered optical structure (504)

200

210

220

230

400

430
440
410
440
420
440
435
445

DUAL-PURPOSE LAYERED OPTICAL STRUCTURE

BACKGROUND

Aspects of the disclosure relate to optical stacks on displays of smart phones. People are now more and more inseparable from smart phones, watching video and text content on smart phones for learning or entertainment. The display screens of existing smart phones generally display text or pictures. When users need to organize their appearance (e.g., use a mirror or other means to view the user's own appearance), because the existing mobile phone screens have poor reflective imaging effects when the screen is off, generally use a front camera on the smart phone (e.g., user taking a "selfie"). However, existing cameras on the smart phone generally have an image distortion defect which does not reflect the user's state well.

BRIEF SUMMARY

Certain embodiments are described that presents a rear-attached high-transmittance reflective lens film that hardly affects the display of a mobile phone. The rear-attached high-transmission reflective film includes an optical transflective film and an optical compensation film. The rear-attached high-transmission reflective film of the present disclosure uses the characteristics of the transflective film to form a mirror surface and can clearly present a portrait when the display screen is not on the screen. The imaging effect when the smart phone screen is black allows the user to not carry a separate mirror and use the display to a reflected image for activities such as putting on makeup or grooming. In addition, the disclosure also discloses a display screen and a smart phone.

In some embodiments, an optical structure with a first protective layer with a first surface and a second surface, an optical compensation layer with a first surface and a second surface, a transflective layer with a first surface and a second surface, and a second protective layer with a first surface. The second surface of the first protective layer is bonded to the first surface of the optical compensation layer, the second surface of the optical compensation layer is bonded to the first surface of the transflective layer, and the second surface of the transflective layer is bonded to the first surface of the second protective layer. The optical structure is configured to receive external light directed from an external environment through the second protective layer, the transflective layer is configured to reflect a component of the external light, as linearly polarized light of a first orientation, back through the second protective layer and out of the optical structure toward the external environment. The optical structure is configured to receive circularly polarized light from a display through the first protective layer. The compensation layer is configured to convert the circularly polarized light into linearly polarized light of a second orientation. The transflective layer is configured to transmit the linearly polarized light of the second orientation through the second protective layer and out of the optical structure toward the external environment.

In some embodiments of the optical structure, the optical compensation layer is a quarter-wave plate.

In some embodiments of the optical structure, the transflective layer is a dual brightness enhancement film.

In some embodiments of the optical structure, the first protective layer is a polyethylene terephthalate.

In some embodiments of the optical structure, the second protective layer is a hard-coated polyethylene terephthalate.

In some embodiments of the optical structure, each layer is bonded to the next layer by an optically clear adhesive.

In some embodiments of the optical structure, a pressure-sensitive adhesive is bonded to the first surface of the first protective layer and configured to adhere to a display.

In some embodiments of the optical structure, the pressure-sensitive adhesive is a silicone gel.

In some embodiments of the optical structure, an outline of the optical structure is the shape of a smart phone.

In some embodiments of the optical structure, each layer has an avoidance area, the avoidance area is within the outline of the optical structure and located where a sensor on the smart phone is when the optical structure is adhered to the smart phone.

In some embodiments of the optical structure, the transflective layer transmits a first direction of polarized light and reflects a second direction of polarized light.

In some embodiments of the optical structure, the first direction is perpendicular to the second direction.

In some embodiments of the optical structure, the transflective layer is configured to transmit at least 90% of light emitted from the display.

In some embodiments, the optical structure is 330-390 um in thickness.

Another aspect of the disclosure relates to a method including: receiving polarized light from a display into an optical structure through a first protective layer, converting a portion of the polarized light from the display into linear light in a first orientation by a compensation layer, transmitting the linear light in the first orientation through a transflective layer out through a second protective layer and into an external environment, receiving external light directed from the external environment into the optical structure through the second protective layer, and reflecting a component of external light, as linearly polarized light in a second orientation, back through the second protective layer and out of the optical structure toward the external environment.

In some embodiments of the method, the polarized light from the display is circularly polarized light.

In some embodiments of the method, the polarized light from the display is linearly polarized light.

In some embodiments of the method, the linearly polarized light is polarized in the second orientation and is rotated 90° to the first orientation by the compensation layer.

In some embodiments, the method further includes reflecting a portion of the polarized light from the display not converted by the transflective layer back through the first protective layer toward the display.

In some embodiments of the method, at least 90% of the polarized light from the display is converted into linear light in the first orientation by the compensation layer.

DETAILED DESCRIPTION

Figure 1:
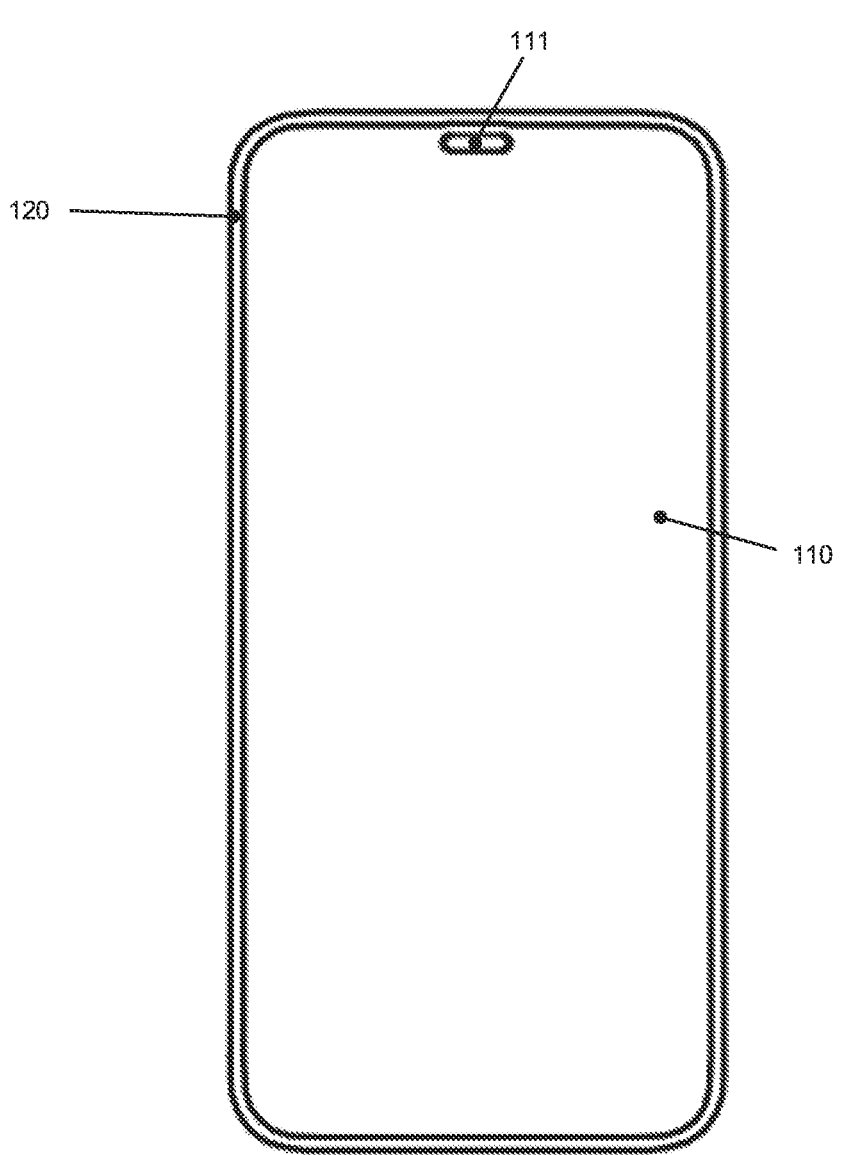
FIG. 1 illustrates an example of a multi-layer transflective film adhered to a display of a phone, according to an aspect of the disclosure.

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure or the spirit of the appended claims.

The embodiments of the present disclosure are described in detail below. Examples of the embodiments are shown in the accompanying drawings, in which the same or similar reference numerals indicate the same or similar elements or elements with the same or similar functions. The embodiments described below with reference to the accompanying drawings are exemplary and are intended to explain the present disclosure but should not be understood as limiting the claims.

The present disclosure proposes a rear-mounted high-transmissive reflective optical structure that does not substantially affect the display of a mobile phone. Here, the phrase "does not substantially affect the display" should be broadly construed as meaning that substantially all of the light emitted by the display is transmitted through the high-transmissive reflective film. For example, this may correspond to a transmission of more than a certain percentage, P, of the light emitted by the display. The percentage P may be, for example, 95%, 99%, 99.5%, 99.9%, etc.

As shown in FIG. 1, a complete system 100 may comprise a phone 120 affixed with a multi-layered transflective sheet 110, according to an embodiment of the present disclosure. The sheet 100 may comprise an optical stack having multiple layers. As shown in FIG. 1, from a top-down view, the upper end of the multi-layered transflective sheet 110 has a first avoiding area 111 (e.g., "cut-out" or "punched-out area"). In this embodiment, the multi-layered transflective sheet 110 is substantially rectangular with the four corners modified to remove each 90-degree angle, so that the four corners are rounded and/or chamfered, matching a surface of the phone 120. The size of the multi-layered transflective sheet 110 may be adjusted to match the specifications of a screen or surface of the phone 120. The avoidance area 111 on the multi-layered transflective sheet 110 can be a hole shape corresponding to devices or sensors on the screen or surface of the phone 120. In some embodiments, there may be multiple avoiding areas to avoid multiple devices or sensors on the screen of the phone 120. The devices or sensors may include, for example, a handset, front camera, light sensor, IR sensor, or speaker.

Figure 2:
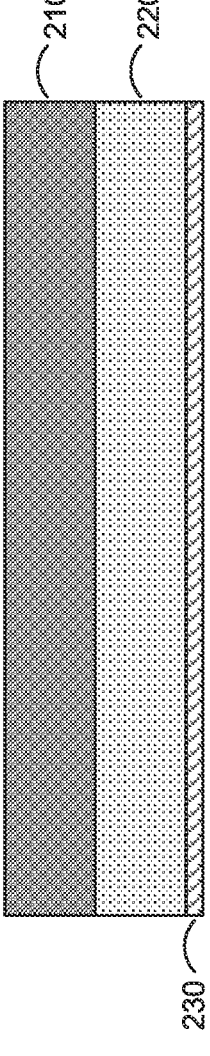
FIG. 2 shows a cross section of an example multi-layer transflective film, according to an aspect of the disclosure.

FIG. 2 shows an example of a cross section of a multi-layered transflective optical stack 200, or transflective optical stack. The multi-layered transflective optical stack 200 is an example of the multi-layered transflective sheet 110 show in FIG. 1. The multi-layered transflective optical stack 200 may transmit and reflect light from a display and from a user. In this example, the multi-layered transflective optical stack 200 may have a semi-transmissive and semi-reflective layer, i.e., a transflective layer 210. In addition to the transflective layer 210, the multi-layered transflective optical stack 200 has an optical compensation layer 220 and an adhesive layer 230. When the optical stack 200 is applied to a device (e.g., the phone 120 shown in FIG. 1), the adhesive layer 230 may be attached to a screen of the device. In some embodiments, a protective layer (not shown) may be used. In these embodiments, there may be a first protective layer mounted to the outermost layer, i.e., the layer furthest from the device, of the multi-layered transflective optical stack 200. The multi-layered transflective optical stack 200 may have a second protective layer (not shown). In this embodiment, the second protective layer may be between the optical compensation layer 220 and the adhesive layer 230.

The transflective layer 210 may transmit light and reflect light. In some embodiments, the transflective layer 210 may transmit linearly polarized light in a first direction and reflect polarized light in a second direction, a direction perpendicular to the first direction. For example, the transflective layer 210 may transmit vertical polarized light and may reflect horizontal polarized light. Examples of a transflective layer 210 are shown below in FIG. 3. A display of the phone 120, in some embodiments, may emit linearly polarized light. In some other embodiments, the display of the phone 120 may emit circularly polarized light.

Figure 3:
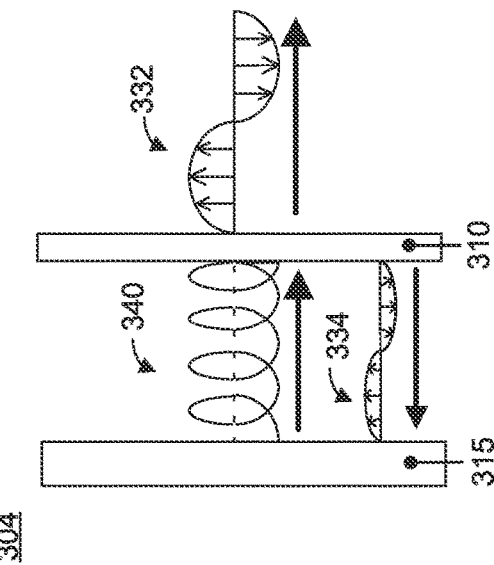
FIG. 3 shows diagrams of linearly and circularly polarized light traversing through example components of a multi-layer transflective film, according to an aspect of the disclosure.
Figure 3:
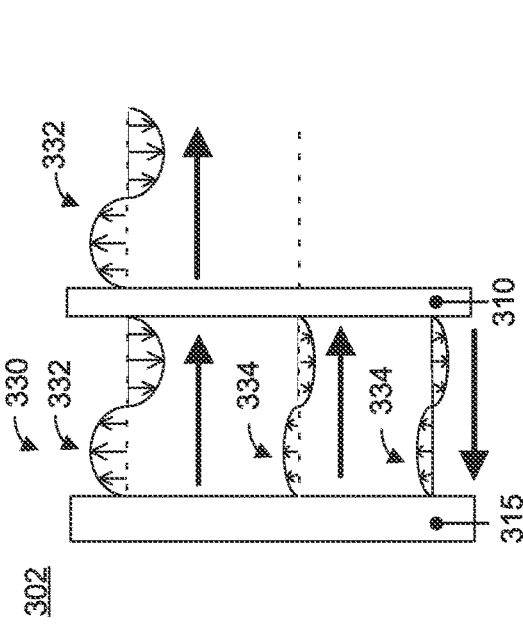
Figure 3:
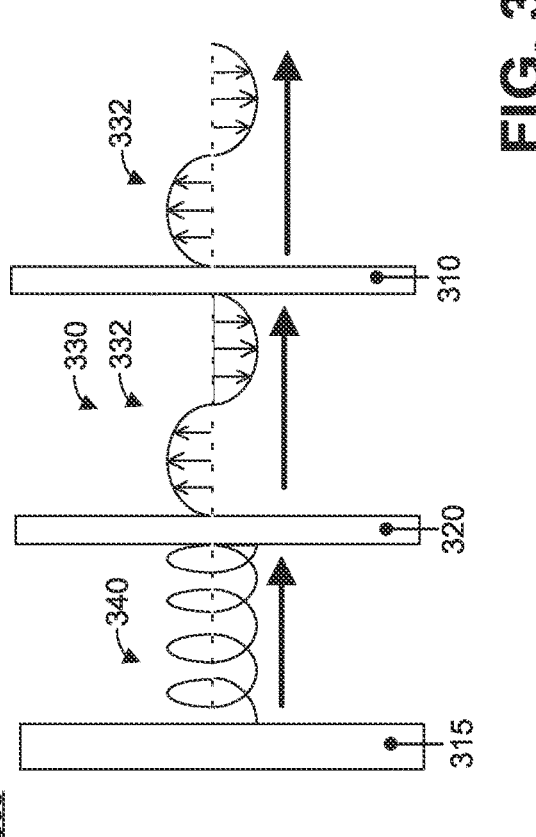

Shown in FIG. 3, are multiple examples of a display 315 emitting polarized light through a transflective layer 310. Example 302 shows linearly polarized light 330 emitted from the display 315 to the transflective layer 310. When the display 315 emits linearly polarize light 330, a component of light having a first direction of polarization, i.e. vertically polarized light 332, may be transmitted through the transflective layer 310. A component of light having a second direction of polarization, i.e. horizontally polarized light 334, may be reflected by the transflective layer 310. In the example, the vertically polarized light 332 transmits through the transflective layer 310 keeping its amplitude, i.e., the brightness from the display 315. The horizontally polarized light 334 is reflected and no horizontally polarized light transmits through the transflective layer 310. Thus, in example 302, the transflective layer 310 transmits all the vertically polarized light 332 and reflects all of the horizontally polarized light 334. The horizontally polarized light 334 may be reflected back toward the display 315 to help the display recycle light and improve efficiency.

Example 304 shows a circularly polarized light 340 emitted from a display 315 to a transflective layer 310. When the display emits a circularly polarized light 340 to the transflective layer 310, the light in the direction of the polarization of the transflective layer 310 may be transmitted while light in all other directions is reflected back. In the example shown, the circularly polarized light 340 has a first component in the vertical polarization direction and a second component in the horizontal polarization direction. The transflective layer 310 transmits polarized light in the vertical direction. Thus, the circularly polarized light 340 emitted from the display 315 has only the polarized light in the vertical direction 332 transmitted through the transflective layer 310. The horizontally polarized light 334 is reflected back toward the display 315. Since only part of the circularly polarized light 340 is transmitted through the transflective layer 310, the amplitude of the transmitted light is reduced, i.e., the brightness of the display as perceived by the user is reduced (even taking into account the recycling of light reflected back toward the display).

Example 306 shows a circularly polarized light 340 emitted from a display 315 through an optical compensation layer 320 before being transmitted to a transflective layer

310. The circularly polarized light 340 first passes through the optical compensation layer 320. The optical compensation layer 320 may be, for example, a quarter wave plate. The optical compensation layer 320 may change the polarization of the light, converting the circularly polarized light 340 to a linearly polarized light 330. If designed correctly, the optical compensation layer 320 and transflective layer 310 should be chosen and orientated so that the linearly polarized light 330 becomes polarized in the direction the transflective layer 310 transmits light, e.g., the optical compensation layer 320 orients the circularly polarized light to a vertical light and the transflective layer 310 transmits vertical light. In the example shown, the optical compensation layer 320 changes the circularly polarized light 340 to vertically polarized light 332. In this example, the transflective layer 310 transmits vertically polarized light. Thus, the entire vertically polarized light 332 may be transmitted through the transflective layer 310. Since a substantial portion of the circularly polarized light 340 emitted from the display 315 is converted into vertically polarized light 332 by the optical compensation layer 320, a substantial portion of the emitted light transfers through the transflective layer 310 and the amplitude of the vertically polarized light 332 remains the same. A substantial portion may be 90%, 95%, 98%, 99%, or more than 99.5% of the initially emitted light.

In one embodiment, as shown in FIG. 2, a multi-layered transflective optical stack 200, such as sheet 110 shown in FIG. 1, may have a transflective layer 210 and an optical compensation layer, such as a quarter wave sheet 220. The quarter wave sheet 220 is provided on the inner surface of the transflective layer 210, i.e., the surface of the transflective layer closest to a display when the optical stack 200 is attached to the display. Each layer in the multi-layered transflective optical stack 200 has an inner surface and outer surface. The inner surface of a layer refers to the surface closest to a display when the multi-layered transflective optical stack 200 is attached to the display. The outer surface of a layer refers to the surface of the layer furthest away from the display when the optical stack 200 is attached to the display. As discussed above, the quarter wave sheet 220 may improve the brightness of the existing display by polarizing the light emitted to the display so that the light transmits through the transflective layer 210. The quarter wave sheet 220 may have a second avoidance zone arranged in correspondence with said first avoidance zone 111, which may be provided in the transflective layer 210. In at least one embodiment, the quarter wave sheet 220 itself has bonding properties, and the quarter wave sheet 220 can be directly bonded to the inner surface of the transflective layer 210. The second avoidance area on the quarter wave sheet 220 can be cut against the first avoidance area 111. Specifically, the quarter wave sheet 220 can be combined with the transflective layer 210, then the first avoidance area 111 and the second avoidance area can be cut out in a single step.

In one embodiment, the transflective layer 210 is a dual brightness enhancement film (DBEF) film, which is typically used to recycle light back into the backlight of a display and thereby increasing display brightness. For example, the DBEF film may comprise 3M's reflective polarizer. The luminous efficiency of this specific DBEF film can be at least 30% higher than other products, which can brighten the screen. While providing better light transmittance, it can also present a better mirror effect under the display screen.

In one embodiment, the lower end of the transflective sheet 210 is provided with a third avoidance area (not shown). Each avoidance area may be cut through each layer of the transflective optical stack. Among them, the third avoidance area may be set for the fingerprint recognition position on the smart phone, so that it is convenient to perform fingerprint recognition after attaching the high-transmitting reflective film on the mobile phone display. The shape of the third avoidance area may be modified according to the actual application. At this time, if the optical compensation layer 220 is arranged on the inner surface of the transflective sheet 210, the optical compensation layer 220 is also provided with a fourth avoidance area corresponding to the third avoidance area, thereby facilitating the user's facial identification or fingerprint identification.

In one embodiment, as shown in FIG. 2, a pressure-sensitive adhesive layer 230 is provided on the inner surface of the multi-layered transflective optical stack 200. The specific adhesive for the pressure-sensitive adhesive layer 230 may be selected according to the actual situation. In some embodiments, the pressure-sensitive adhesive layer 230 may be selected so that the transflective sheet 210 may be close to the mobile phone display screen. Shown in FIG. 2 the optical compensation layer 220 is arranged on the inner surface of the transflective sheet 210, the pressure-sensitive adhesive layer 230 is arranged on the inner surface of the optical compensation film. In some embodiments, when there is no optical compensation layer 220, the adhesive layer 230 may be attached directly to the inner surface of the transflective sheet 210. In still some other embodiments, when there is a protective layer (not shown), the adhesive sheet may be attached to the inner surface of the protective layer. In some embodiments, the above attachment method can also be replaced with an electrostatic attachment, so as to facilitate the attachment of the high-transmittance film after replacement.

Figure 4:
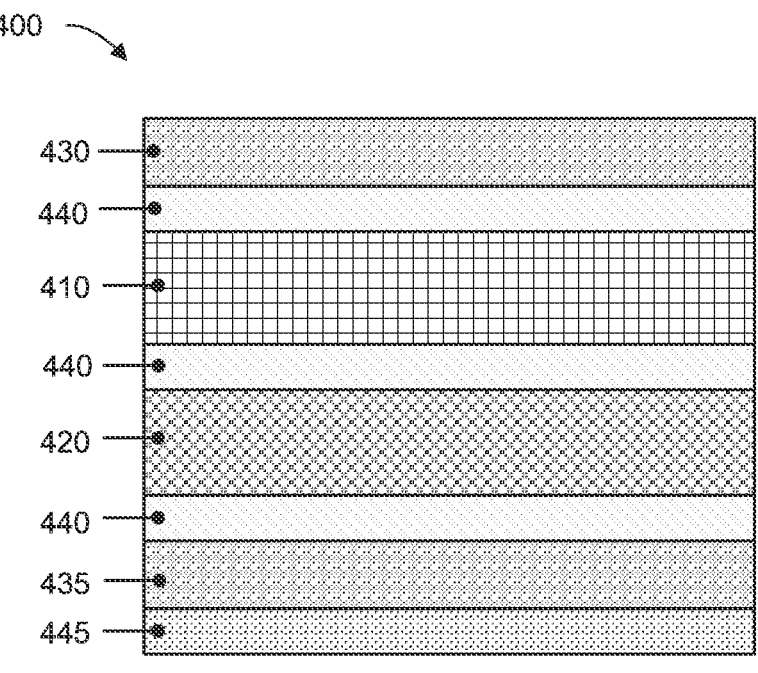
FIG. 4 shows a cross section of an example multi-layer transflective film, according to an aspect of the disclosure

FIG. 4 shows an example of multi-layered transflective optical stack 400, according to one specific implementation. The optical stack 400 may be used, for example, with an organic light emitting diode (OLED) display on a mobile phone (not shown) which may emit circularly polarized light. In the example shown in FIG. 4, the multi-layered transflective optical stack 400 has a transflective film 410, an optical compensation layer 420, a hard coated polyethylene terephthalate (HC PET) film 430, a polyethylene terephthalate (PET) film 435, optically clear adhesive layers 440, and a press-sensitive adhesive layer 445. In some embodiments, the transflective optical stack 400 may be 330-390 um in thickness. In still some other embodiments, the transflective optical stack may be 390-460 um in thickness.

When the multi-layered transflective stack 400 is affixed to the display of a mobile phone, the HC PET 430 may be the top, or outermost, layer. The HC PET film 430 may provide protection from scratches and other types of damage that may be sustained with regular use of the mobile phone. In the example shown, the HC PET film 430 is 40-60 um in thickness. Next to the HC PET film 430 is the transflective film 410. The HC PET film and the transflective film 410 are bonded by an optically clear adhesive layer 440. The same type or different types of optically clear adhesive may be used to bond different layers of the optical stack 400. In the example shown, each optically clear adhesive layer 440 may be 15-35 um in thickness.

In the example shown, the transflective film 410 is the closest non-adhesive layer to the HC PET 430 layer. One example of a transflective film 410 is the 3M DBEF QV2 film. As discussed above, the transflective film 410 may allow transmission of linearly polarized light in one direction and reflect linearly polarized light in a second direction. In some embodiments, the polarized light reflected by the transflective film 410 may be recycled back toward the display and boost display performance. In some embodiments, the transflective film may be 80-110 um in thickness. In still some other embodiments, the transflective film 410 may be 105-135 um in thickness.

On the inner surface side of the transflective film 410, the multi-layered transflective optical stack 400 may have an optical compensation layer 420. The optical compensation layer 420 and the transflective film 410 may be bonded by an optically clear adhesive layer 440. The optical compensation layer 420 may be a birefringent wave retarder, such as a quarter-wave plate. As discussed earlier, the quarter-wave plate may convert circularly polarized light into linearly polarized light. If the transflective film 410 is effective in use with linearly polarized light, the optical compensation layer 420 may be used to convert the circularly polarized light emitted from the phone display to linearly polarized light for transmission through the transflective film 410. In some embodiments, the optical compensation layer may be 60-90 um in thickness.

The PET film 435 is on the inner side of the optical compensation layer 420. The PET film 435 is the closest non-adhesive layer in the multi-layered transflective optical stack 400 to a display when the optical stack is mounted to the display and may be attached to the optical compensation layer 420 via an optically clear adhesive layer 440. The PET film 435 may be used to protect the transflective film 410 when the multi-layered transflective optical stack 400 is applied to the display screen of the phone.

The layer of the multi-layered transflective optical stack 400 closest to a display when mounted to the display is the press-sensitive adhesive layer 445. The press-sensitive adhesive layer 445 may be a silicone gel. In this example, the silicone gel may be approximately 10-30 um thick. The silicone gel or adhesive layer may be used to provide adhesion so that the multi-layered transflective optical stack 400 may be readily affixed and stay attached to the display screen. In this particular example, the total thickness of the multi-layered transflective sheet is 310-460 um. The thicknesses for various layers describe here, as well as the total thickness of the multi-layered transflective sheet structure, are all example values. Variations may be appropriate depending on application and other considerations.

In some embodiments, the multi-layered transflective stack (not shown) may not have an optical compensation layer. In these embodiments, the multi-layered transflective stack may have a transflective layer between a first protective layer and a second protective layer. The transflective layer may be bonded to the first protective layer by an optically clear adhesive. Similarly, the transflective layer may be bonded to the second protective layer by a second optically clear adhesive. The multi-layered transflective stack may have an adhesive layer which may be used to attach the multi-layered transflective stack to a display. In this embodiment, the light emitted from the display in the orientation allowed to pass through the transflective layer may pass through the transflective layer and through the multi-layered transflective stack. Light emitted from the display in a second orientation may not be converted into the proper orientation to be displayed. Thus the light emitted from the display in the second orientation may not transmit through the transflective layer and thus the multi-layered transflective layer, reducing the brightness of the display through the transflective stack. For example, the transflective layer may allow vertically polarized light while reflecting other orientations of light. Thus, if the display emits circularly polarized light, the vertical component of the circularly polarized light may be transmitted while the light in other orientations may be reflected back towards the display.

Figure 5:
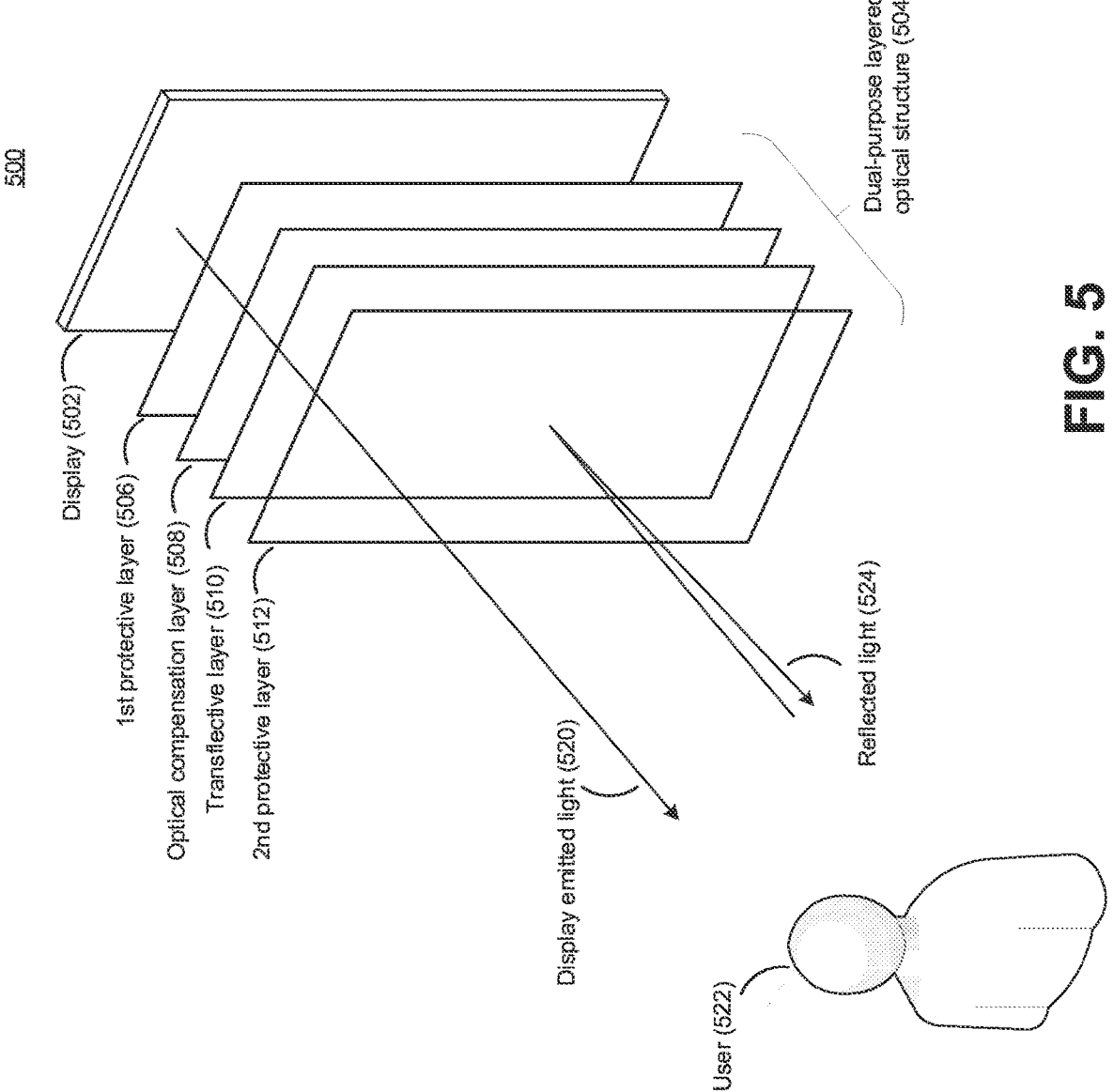
FIG. 5 is a perspective view of a rear-mounted high-transmitting reflective film, which provides display transmitted light from a display to a user while providing reflected light to the user, according to an aspect of the disclosure.

FIG. 5 is a perspective view of a transflective multi-layered optical stack 504, which provides both transmitted light from a display and reflected light to a user 522, according to one embodiment of the disclosure. The transflective multi-layered optical stack 504 may also be referred to as a dual-purpose optical structure. Here, a complete system 500 is shown, with a display (e.g., smart phone display) 502 and a transflective multi-layered optical stack 504. The optical stack 504 may include a first protective layer 506, an optical compensation layer 508, a transflective layer 510, and a second protective layer 512. The first protective layer 506 may be, for example an HC PET material. The optical compensation layer 508 may be, for example, a quarter-wave plate. A quarter-wave plate, which may take the form of a film, may convert circularly polarized light to linearly polarized light as discussed in FIG. 3. The transflective layer 510 may be a film such as DBEF/QV2 film as discussed previously. The second protective layer 512 may be, for example, a PET material.

The transflective multi-layered optical stack 504 serves to (1) transmit light 520 emitted from the display 502 (such as from a smart phone) toward a user 522, when the display is on, and (2) reflect light 524 back toward the user 522, when the display is off (or in a reduced brightness state). Reflection of light 524 allows the user 522 to use the system 500 as a mirror, for occasions when a mirror is needed. When the display is on, the brightness of the transmitted light 520 originating from the display 502 dominates and is sufficiently high to overcome the reflected light 524 from the user 522. The overall effect has the appearance of presenting no mirrored reflection from the perspective of the user 522. However, when the display 502 is off, the light 520 is no longer present, and the brightness of the reflected light 524 forms the mirror effect seen from the perspective of the user 522.

The transflective layer 510 may distinguish between transmission and reflection based on polarization. Just as an example, the transflective layer 510 may be configured to allow light of a particular orientation of vertical polarization (e.g., vertical polarization) to transmit through, while reflecting light of a different orientation of vertical polarization (e.g., horizontal polarization). Thus, vertically polarized light resulting from emissions from the display 502 may be transmitted by the transflective layer 510 and sent toward the user 522. By contrast, horizontally polarized light from the user 522 (e.g., resulting from ambient illumination of the user's face) may be reflected back to the user 522, thus creating a mirror effect.

In this particular example, the light emitted directly from the display 502 may be circularly polarized. The optical compensation layer 508 facilitates better transmission of light from the display 502 toward the user 522. In one embodiment, the optical compensation layer 508 is a quarter-wave plate and the chosen transflective layer efficiently transmits vertically polarized light. The quarter-wave plate may convert the circularly polarized light from the display 502 into vertically polarized light, prior to the light being transmitted to the transflective layer 510. Because the light has been converted to vertically polarized light, and the transflective layer 510 transmits vertically polarized light with high efficiency, the display emitted light 520 may be brighter from the from the perspective of the user 522. In this case, if the optical compensation layer 508 were to be removed, the transflective layer 510 would only partially transmit the light, i.e., only the vertically polarized light emitted from the display 502, which would result in lower display brightness as seen from the perspective of the user 522.

The transflective multi-layered optical stack 504 is configured to receive external light directed from an external environment through the second protective layer 512. As shown in FIG. 5, light from the external environment, where the user 522 is, may be received through the second protective layer 512 towards the transflective layer 510. The transflective layer 510 may be configured to reflect a component of the external light, as linearly polarized light of a first orientation, back through the second protective layer 512 and out of the optical stack 504 towards the external environment. In this example, the light from the external environment is sent through the second protective layer 512, towards the transflective layer 510. The component of the light from the external environment polarized in the first orientation, for example, horizontally polarized light, is reflected off the transflective layer 510. The reflected light 524 is of a first orientation and reflects off the transflective layer 510 and back out through the second protective layer 512. For example, the reflected light 524 may be the horizontal polarized component of the light from the external environment and may be reflected off the transflective layer 510 and goes back through the second protective layer 512 and out to the external environment where the user 522 is. In some embodiments, the transflective layer 510 may be configured to reflect vertically polarized light. In this embodiment, the reflected light 524 is the vertically polarized component of the light entering from the external environment.

The transflective multi-layered optical stack 504 is configured to receive polarized light from the display 502 through the first protective layer 506. In the embodiment shown, the first protective layer 506 is closest to the display 502. The display 502 may emit light 520 which may be polarized. In some embodiments, the polarized light may be linearly polarized, e.g., vertically polarized light. In some embodiments, the polarized light may be circularly polarized light. The display emitted light 520 may be received by the optical structure 504 through the first protective layer 506. In the example where the display emitted light 520 is circularly polarized light, the circularly polarized light travels from the display 502 to the optical structure 504 through the first protective layer 506. In the embodiment shown. The optical structure 504 has an optical compensation layer 508. The optical compensation layer may be configured to convert the circularly polarized light into linearly polarized light into a second orientation. For example, the second orientation may be the orientation the transflective layer 510 allows light to pass through. In this example, the transflective layer 510 may reflect horizontally polarized light and allow vertically polarized light to pass through. Thus, the optical compensation layer 508 may convert circularly polarized light into vertically polarized light. Thus, in the example where the display emitted light 520 is circularly polarized, the light is converted by the optical compensation layer 508 to be vertically polarized light. The transflective layer 510 is configured to transmit the linearly polarized light of the second orientation through the second protective layer 512 and out of the optical structure 504 into the external environment. In the example, the light that is vertically polarized from the optical compensation layer 508 transmits the vertically polarized light through the transflective layer 510 and out of the optical structure 504 through the second protective layer 512. Thus, as discussed above, the optical structure 504 may emit light from the display 502 while reflecting light from the external environment.

In some embodiments, the optical compensation layer 508 may not convert the entire polarized light into light in the second orientation. The light not converted into light in the second orientation may be reflected by the transflective layer 510 back through the compensation layer 508 through the first protective layer 506 toward the display 502.

The various layers of the dual-purpose layered optical structure 504 may be bonded together using optically clear adhesive (OCA) layers (not shown), as discussed previously. The dual-purpose layered optical structure 504 may have rounded or chamfered (not shown) corners, as discussed previously. In addition, the dual-purpose layered optical structure 504 may have one or more avoidance areas (not shown), which leaves openings for devices such as cameras, fingerprint sensors, other types of sensors, speakers, etc.

The present disclosure further provides a display screen and a smart phone. The display screen includes the rear-attached high-transmission reflective film in the above-mentioned embodiments.

The above only describes specific embodiments of the present disclosure. The specific embodiments are described to illustrate aspects of the disclosure and not intended to limit the scope of the claims.

What is claimed is:

1. An optical structure comprising:
a first protective layer with a first surface and a second surface;
an optical compensation layer with a first surface and a second surface;
a transflective layer with a first surface and a second surface; and
a second protective layer with a first surface wherein:
the second surface of the first protective layer is bonded to the first surface of the optical compensation layer,
the second surface of the optical compensation layer is bonded to the first surface of the transflective layer,
the second surface of the transflective layer is bonded to the first surface of the second protective layer,
the optical structure is configured to receive external light directed from an external environment through the second protective layer,
the transflective layer is configured to reflect a component of the external light, as linearly polarized light of a first orientation, back through the second protective layer and out of the optical structure toward the external environment,
the optical structure is configured to receive circularly polarized light from a display through the first protective layer,
the compensation layer is configured to convert the circularly polarized light into linearly polarized light of a second orientation, and
the transflective layer is configured to transmit the linearly polarized light of the second orientation through the second protective layer and out of the optical structure toward the external environment.

2. The optical structure of claim 1, wherein the optical compensation layer is a quarter-wave plate.

3. The optical structure of claim 1, wherein the transflective layer is a dual brightness enhancement film.

4. The optical structure of claim 1, wherein the first protective layer is a polyethylene terephthalate.

5. The optical structure of claim 1, wherein the second protective layer is a hard-coated polyethylene terephthalate.

6. The optical structure of claim 1, wherein each layer is bonded to the next layer by an optically clear adhesive.

7. The optical structure of claim 1, wherein a pressure-sensitive adhesive is bonded to the first surface of the first protective layer and configured to adhere to a display.

8. The optical structure of claim 7, wherein the pressure-sensitive adhesive is a silicone gel.

9. The optical structure of claim 1, wherein an outline of the optical structure is the shape of a smart phone.

10. The optical structure of claim 9, wherein each layer has an avoidance area, the avoidance area is within the outline of the optical structure and located where a sensor on the smart phone is when the optical structure is adhered to the smart phone.

11. The optical structure of claim 1, wherein the transflective layer transmits a first direction of polarized light and reflects a second direction of polarized light.

12. The optical structure of claim 11, wherein the first direction is perpendicular to the second direction.

13. The optical structure of claim 1, wherein the transflective layer is configured to transmit at least 90% of light emitted from the display.

14. The optical structure of claim 1, wherein the optical structure is 330-390 um in thickness.

* * * * *